(12) United States Patent
Burke

(10) Patent No.: US 7,410,714 B1
(45) Date of Patent: Aug. 12, 2008

(54) UNITIZED REGENERATIVE FUEL CELL SYSTEM

(75) Inventor: Kenneth A. Burke, Chardon, OH (US)

(73) Assignee: The United States of America as represented by the Administration of NASA, Washington, DC (US)

( * ) Notice: Subject to any disclaimer, the term of this patent is extended or adjusted under 35 U.S.C. 154(b) by 401 days.

(21) Appl. No.: 10/891,599

(22) Filed: Jul. 15, 2004

(51) Int. Cl.
*H01M 8/18* (2006.01)

(52) U.S. Cl. .............................. 429/26; 429/21; 429/22; 429/24; 429/25

(58) Field of Classification Search ........................ None
See application file for complete search history.

(56) References Cited

U.S. PATENT DOCUMENTS

| | | |
|---|---|---|
| 3,975,913 A | 8/1976 | Erickson |
| 3,981,745 A | 9/1976 | Stedman |
| 4,087,976 A | 5/1978 | Morrow, Jr. et al. |
| 4,120,787 A | 10/1978 | Yargeu |
| 4,128,701 A | 12/1978 | Miricle |
| 4,248,941 A | 2/1981 | Louis et al. |
| 4,311,771 A | 1/1982 | Walther |
| 4,344,849 A | 8/1982 | Grasso et al. |
| 4,344,850 A | 8/1982 | Grasso |
| 4,410,606 A | 10/1983 | Loutfy et al. |
| 4,482,614 A | 11/1984 | Zito, Jr. |
| 4,490,445 A | 12/1984 | Hsu |
| 4,513,066 A | 4/1985 | Simon |
| 4,520,081 A | 5/1985 | Hohne et al. |
| 4,530,886 A | 7/1985 | Sederquist |
| 4,818,637 A | 4/1989 | Molter et al. |
| 4,839,247 A | 6/1989 | Levy et al. |
| 4,906,817 A * | 3/1990 | Kurz ........................... 392/442 |
| 4,990,412 A | 2/1991 | Hersey |
| 5,034,287 A | 7/1991 | Kunz |
| 5,064,732 A * | 11/1991 | Meyer ......................... 429/13 |
| 5,133,928 A * | 7/1992 | Oldfield ....................... 420/105 |
| 5,277,994 A | 1/1994 | Sprouse |
| 5,306,577 A | 4/1994 | Sprouse |
| 5,312,699 A | 5/1994 | Yanagi et al. |
| 5,316,643 A * | 5/1994 | Ahn et al. .................... 204/265 |
| 5,338,622 A | 8/1994 | Hsu et al. |
| 5,346,778 A | 9/1994 | Ewan et al. |
| 5,346,779 A | 9/1994 | Nakazawa |
| 5,376,470 A | 12/1994 | Sprouse |
| 5,401,589 A | 3/1995 | Palmer |
| 5,407,756 A | 4/1995 | Sprouse |

(Continued)

*Primary Examiner*—Jonathan Crepeau
*Assistant Examiner*—Tony Chuo
(74) *Attorney, Agent, or Firm*—Howard M. Cohn

(57) ABSTRACT

A Unitized Regenerative Fuel Cell system uses heat pipes to convey waste heat from the fuel cell stack to the reactant storage tanks. The storage tanks act as heat sinks/sources and as passive radiators of the waste heat from the fuel cell stack. During charge up, i.e., the electrolytic process, gases are conveyed to the reactant storage tanks by way of tubes that include dryers. Reactant gases moving through the dryers give up energy to the cold tanks, causing water vapor in with the gases to condense and freeze on the internal surfaces of the dryer. During operation in its fuel cell mode, the heat pipes convey waste heat from the fuel cell stack to the respective reactant storage tanks, thereby heating them such that the reactant gases, as they pass though the respective dryers on their way to the fuel cell stacks retrieve the water previously removed.

7 Claims, 3 Drawing Sheets

U.S. PATENT DOCUMENTS

| | | |
|---|---|---|
| 5,506,066 A | 4/1996 | Sprouse |
| 5,510,202 A | 4/1996 | McCoy |
| 5,540,831 A | 7/1996 | Klein |
| 5,678,410 A | 10/1997 | Fujita |
| 5,753,383 A | 5/1998 | Cargnelli et al. |
| 5,885,727 A | 3/1999 | Kawatsu |
| 5,962,155 A * | 10/1999 | Kuranaka et al. ............. 429/20 |
| 6,042,964 A | 3/2000 | Sharma et al. |
| 6,083,636 A | 7/2000 | Hsu |
| 6,399,231 B1 | 6/2002 | Donahue et al. |
| 6,410,180 B1 | 6/2002 | Cisar et al. |
| 6,447,945 B1 | 9/2002 | Strecker et al. |
| 6,458,477 B1 | 10/2002 | Hsu |
| 6,576,362 B2 | 6/2003 | Hanton |
| 6,579,638 B2 | 6/2003 | Brassard |
| 6,821,663 B2 * | 11/2004 | McElroy et al. ............... 429/17 |
| 2002/0006537 A1 | 1/2002 | Kobayashi et al. |
| 2002/0017463 A1 | 2/2002 | Merida-Donis |
| 2002/0022165 A1 | 2/2002 | Brassard |
| 2002/0025467 A1 | 2/2002 | Staats, III |
| 2003/0008192 A1 | 1/2003 | Freund et al. |
| 2003/0011721 A1 | 1/2003 | Wattelet et al. |
| 2003/0031906 A1 * | 2/2003 | Cargnelli et al. ............... 429/26 |
| 2003/0059664 A1 | 3/2003 | Menjak et al. |
| 2003/0068544 A1 | 4/2003 | Cisar et al. |
| 2003/0091880 A1 | 5/2003 | Joos et al. |
| 2003/0134172 A1 | 7/2003 | Grande et al. |
| 2003/0148152 A1 | 8/2003 | Morrisey |
| 2004/0062961 A1 * | 4/2004 | Sato et al. ..................... 429/19 |
| 2004/0247960 A1 * | 12/2004 | Sato et al. ..................... 429/20 |

* cited by examiner

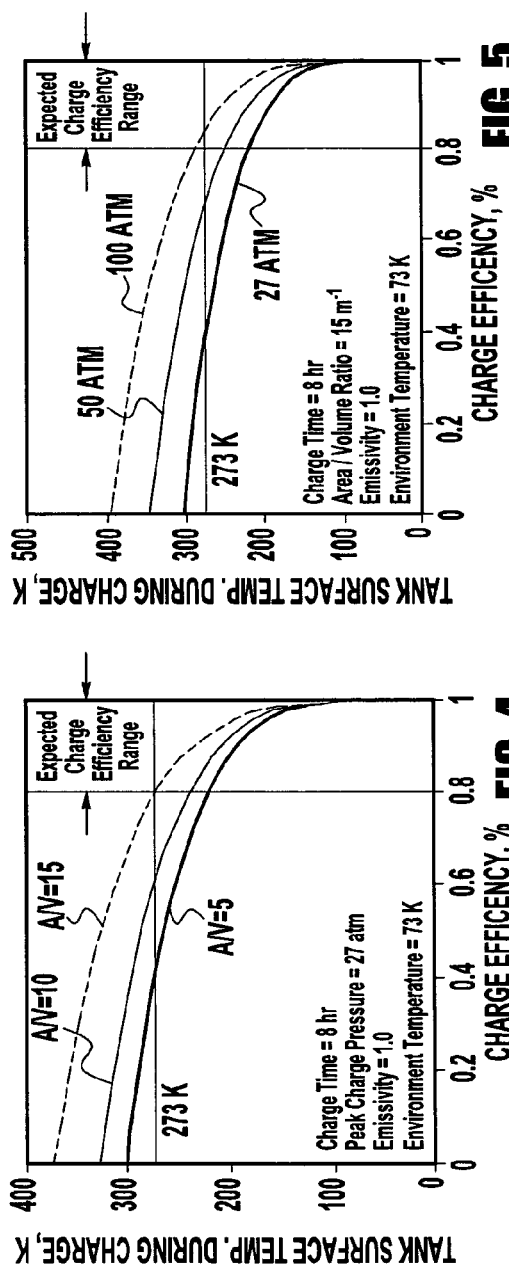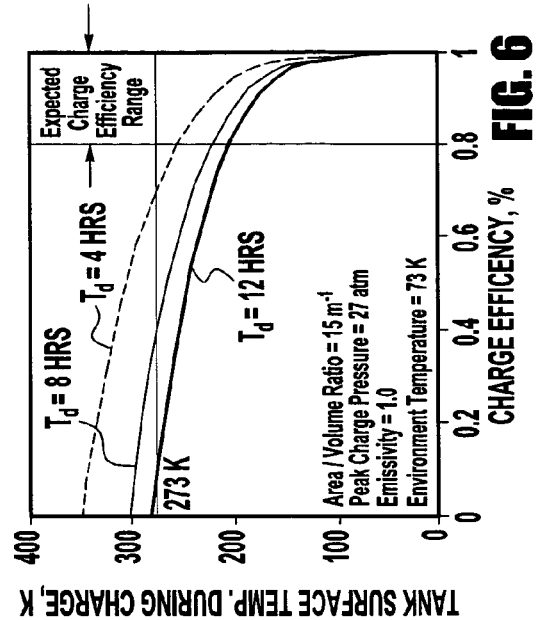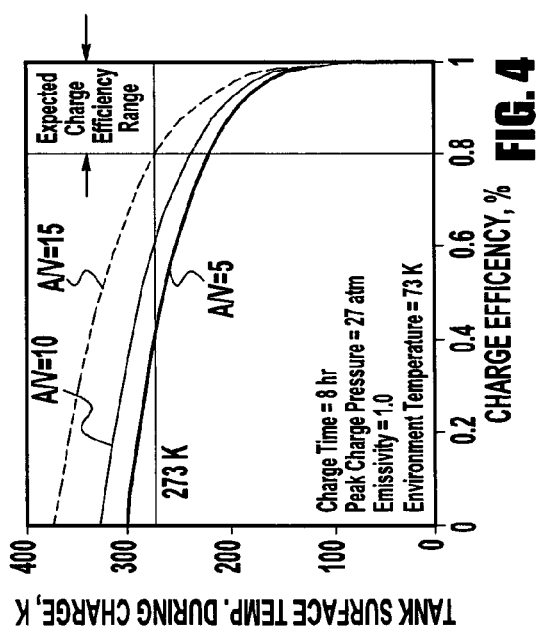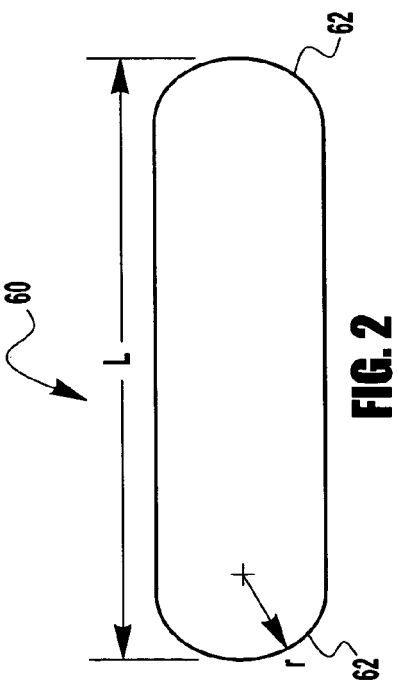

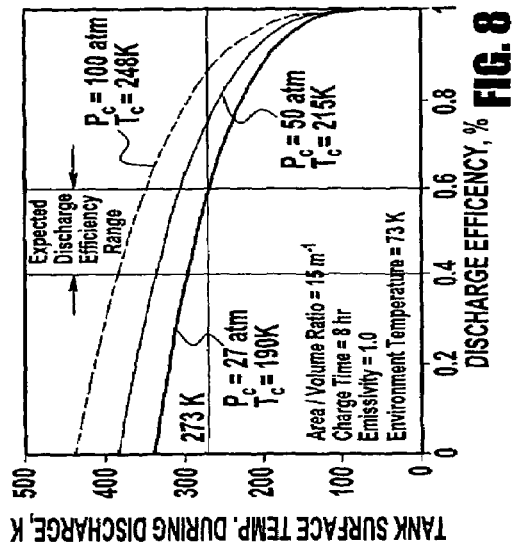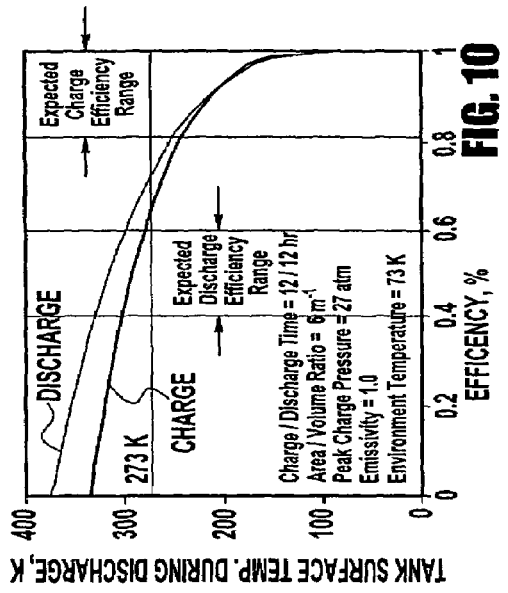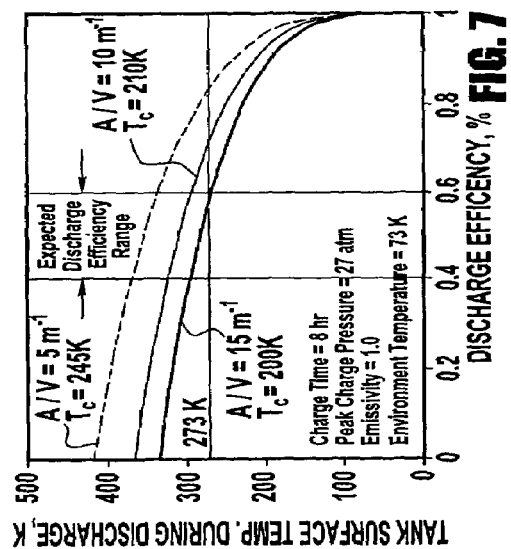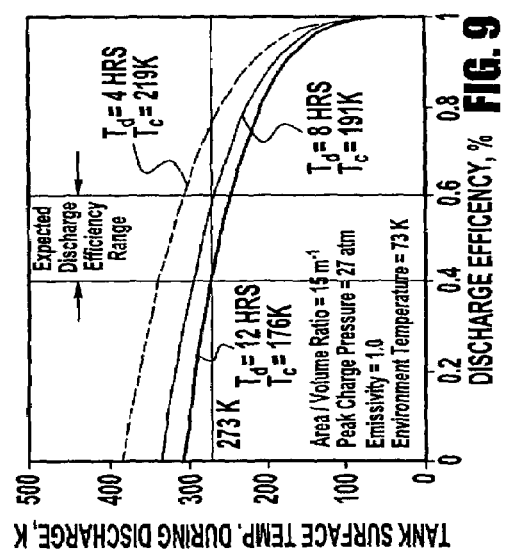

UNITIZED REGENERATIVE FUEL CELL SYSTEM

STATEMENT REGARDING FEDERALLY SPONSORED RESEARCH OR DEVELOPMENT

The invention described herein was made by an employee of the United States Government and may be manufactured and used by or for the Government for Government purposes without the payment of any royalties thereon or therefore.

TECHNICAL FIELD

The present invention relates to fuel cells, and in particular to regenerative, Proton Exchange Membrane fuel cells and to the management of waste heat associated with the use thereof in the charging and in the discharging modes of operation.

BACKGROUND OF THE INVENTION

Unitized Regenerative Fuel Cells (URFCs) are being developed by several fuel cell manufacturers. The applications for this technology are the same as for Regenerative Fuel Cell (RFC) systems. Specific NASA applications include high altitude airships, lunar or Mars-based outposts, and other secondary battery applications where the discharge period is 1 to 2 hours long or longer.

The URFCs developed to date are all based on the Proton Exchange Membrane (PEM) technology. The key advantage of the URFC over other RFC systems is that the URFC does both the process of electrolysis of water as well as the process of recombining of the hydrogen and oxygen gas byproducts to produce electricity. Because of this advantage, a one cell stack of a URFC system replaces the one electrolysis cell stack and one fuel cell stack of the prior art RFC systems. This reduction in fuel cell stacks saves a substantial amount of weight since the cell stacks are the major components of a RFC system. Besides saving the weight of one cell stack, the plumbing, wiring and ancillary equipment for one cell stack is also eliminated.

The operation of the URFC system is also simpler. A RFC requires that when the fuel cell stack is active, the electrolysis cell stack must be kept warm to avoid freezing water lines and transient warm-up periods. Likewise, as the electrolysis cell stack is active, the fuel cell stack must be kept warm to avoid freezing water lines, excessive condensation, and transient warm-up periods. Maintaining cell stacks in standby conditions complicates the overall system design, resulting in greater mass, volume, and parasitic power.

Early efforts to develop a regenerative cell resulted in cells with poor performance or cells not easily reversed in their operation. Dedicated fuel cells or electrolysis cells often have the reactants circulated through the cell stack. Usually the circulating reactants function to remove the byproducts of the fuel cell reaction (product water during fuel cell operation, and product gases during electrolysis cell operation). Sometimes the reactants are also circulated for cooling of the cell stack during its operation. For a URFC to act without circulation pumps requires that the reactants not be circulated through the cell stack, but instead, be "dead-ended" into the cell stack.

As an energy storage system, the URFC system "charges" and "discharges" like a rechargeable battery. While charging, the URFC operates the electrolysis process, which splits water into hydrogen and oxygen. While discharging, the URFC operates the fuel cell process, which combines hydrogen and oxygen and produces electricity.

The gases produced during electrolysis are expelled from the cell stack by the production of still more gas inside the cell stack. The continued production of gases by the cell stack pushes the gases into the reactant storage tanks, gradually "pumping" the gases to higher and higher pressure where they are stored. In addition to the oxygen and hydrogen, a certain level of water vapor also accompanies these gases when they are expelled from the cell stack.

During the URFC fuel cell process, as gases are consumed inside the cell stack, more gas is delivered to the cell stack by the pressurized reactant storage tanks.

The management of reactants inside the URFC cell stack is highly influenced by both the materials and the construction inside the cell stack. Besides the development of the reversible electrodes, proper and reliable reactant management inside the cell stack is most important to achieving acceptable URFC performance. Achieving this level of reactant management inside the cell stack during both electrolysis and fuel cell operation, and the transitions between these different processes, is currently the single biggest hurdle yet to be accomplished.

In the past, a number of reversible or regenerative fuel cells designs were known.

For example, U.S. Pat. No. 3,975,913 to Erickson discloses a closed-cycle gas generator in which one chemical, such as water, is reacted with a metal, such as molten aluminum, to produce hydrogen gas which, along with $O_2$ from a separate storage tank, is conveyed to a fuel cell. Waste heat from the gas generator drives a closed-cycle heat engine.

U.S. Pat. No. 4,490,445 to Hsu discloses a reversible "solid oxide electrochemical energy converter" having a counterflow heat exchanger that disposes of waste heat by directing it to heating the incoming fuel gases.

U.S. Pat. No. 5,338,622 to Hsu, et al discloses a fuel cell system that specifically addresses the issue of waste heat management by means of a counterflow heat exchanger assembly.

U.S. Pat. No. 5,401,589 to Palmer, et al discloses a fuel cell with a reformer, wherein the reformer receives waste heat from the fuel cell. Waste heat is also conveyed to a space heating system and also to a 'bottoming cycle' engine and, if at too low a temperature, is discharged to the atmosphere.

U.S. Pat. No. 5,506,066 ('066) to Sprouse discloses an 'ultra passive,' variable pressure RFC having a single $H_2$ storage tank "that encloses a plurality of smaller gaseous $O_2$ storage tubes." No pumping elements are used. A heating/cooling coil inside the $H_2$ tank prevents icing or overheating. The source or sink of the heat for said coil is not specified.

U.S. Pat. No. 5,510,202 ('202) to McCoy discloses a variable pressure fuel cell. McCoy uses prior art images similar to those of in the '066 patent, suggesting a possible similarity of the '202 patent's waste heat management system to that of the '066 patent.

U.S. Pat. No. 5,678,410 to Fujita et al discloses a fuel cell system for use with cars. For example, "The combined system preferably includes a heat storage tank disposed in a conduit of a heating medium . . . ." A heat transfer medium, "such as water," is used to convey heat to various heat exchangers including one that moves heat to or from a metal-hydride storage tank.

U.S. Pat. No. 5,885,727 to Kawatsu discloses a fuel cell arrangement in which waste heat is conveyed, by way of apparently integral cooling water tubes, to reaction tanks 30 and 50 wherein, respectively, oxygen and hydrogen are generated for use in the fuel cell.

In addition to the above US patents, a PCT patent US 2003/001721 A1 to Wattelet et al discloses a mobile and compact fuel cell system having "an integrated heat exchanger unit" that combines the fuel cell cooling system and a cathode exhaust gas condenser, both being cooled, in parallel, by a shared cooling air stream. A cooling tube (callout number 38) appears integrated with the fuel cell.

ASPECTS OF THE INVENTION

It is an aspect of the present invention to provide methods and apparatus as defined in one or more of the appended claims and, as such, having the capability of accomplishing one or more of the following subsidiary aspects.

In accordance with the foregoing, one aspect of the present unitized regenerative fuel cell (URFC) invention is to minimize system components to "bare essentials," eliminating ancillary equipment that would add unnecessary mass, volume, and parasitic power usage.

Another aspect of the present invention is to provide a reversible or regenerative electric-energy storage system that operated in a way that is equivalent to that of a rechargeable battery in which the active fuel cell portions and the electrolysis portions are one and the same and in which pumps are not used or needed to circulate coolant and otherwise manage waste heat.

Another aspect of the present invention is to minimize the system weight, volume, and parasitic power of the URFC.

Yet another aspect of the present invention is to use a heat pipe method of heat transfer for the removal of waste heat from the active proton exchange membrane portion of the fuel cell.

And a still further aspect of the present invention is to provide a way to remove water that is carried in the fuel gases generated during the electrolysis or charging mode of operation.

SUMMARY OF THE INVENTION

The present invention is a unitized regenerative fuel cell (URFC) system comprising reactant storage tanks, a water storage reservoir, a fuel cell stack, fuel cell pressure control devices, reactant gas feed lines, and power input/outputs and controls. The reactant gas storage tanks are sized and shaped to act as heat sinks and/as waste heat radiators to the ambient environment. Heat pipes convey waste heat from the fuel cell stack to the reactant gas storage tanks. Portions of the heat pipes thermally communicate with the respective reactant gas storage tanks. The reactant gas storage tanks are cylindrical and have hemispherical ends. A reactant gas dryer is disposed within each of the respective reactant gas feed lines communicating between the respective reactant gas storage tanks and the fuel cell stack. Each of the dryers is in thermal contact with the respective reactant gas storage tank. Each dryer is able to operate reversibly, returning water to the reactant gases as said reactant gases flow toward the fuel cell stack. An expandable bellows type water storage reservoir is contained within a pressure dome. Said bellows type water storage reservoir opens to a maximum volume when no internal or external forces act upon it. A reactant gas pressure line communicates between one of the reactant gas feed lines and the expandable water storage reservoir. The expandable water storage reservoir is spring-loaded in such a way as to cause its volume to increase to a maximum when no other force acts upon the storage tank.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
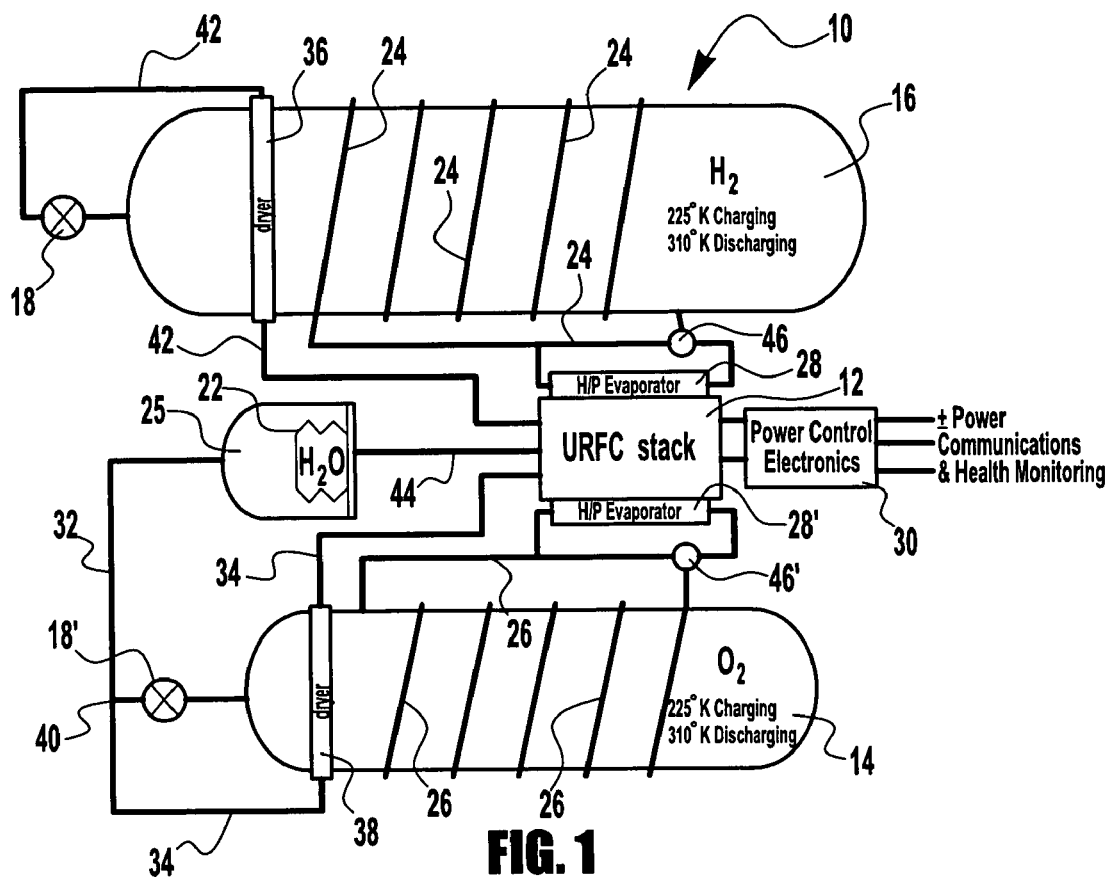
Figure 3:
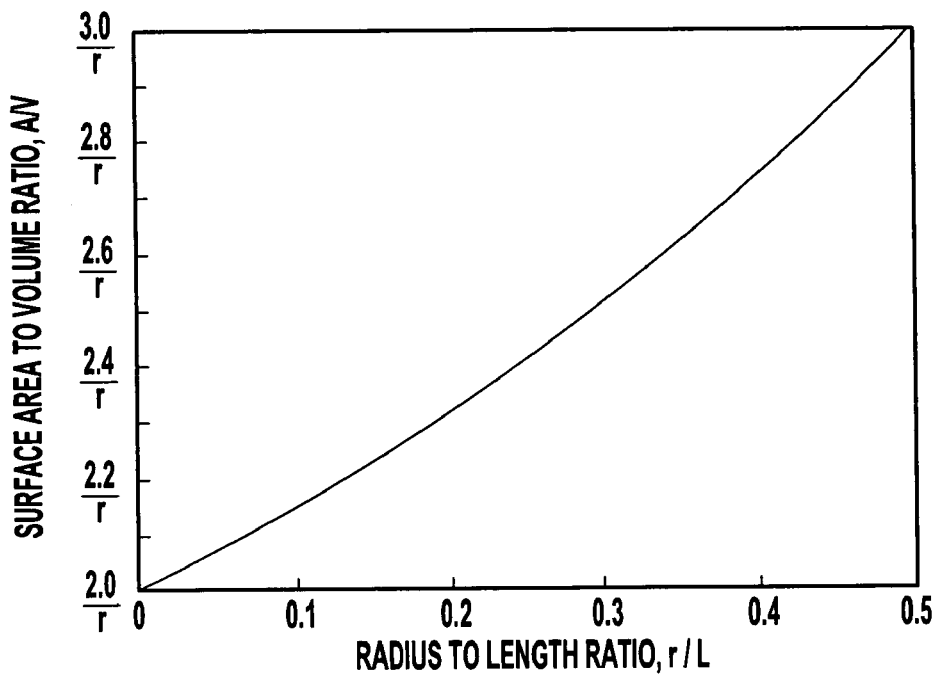

The structure, operation, and advantages of the present preferred embodiment of the invention will become further apparent upon consideration of the following description taken in conjunction with the accompanying drawings, wherein:

FIG. 1 is a schematic diagram of the Unitized Regenerative Fuel Cell (URFC) system according to the present invention;

FIG. 2 is a graphic definition of the dimensional parameters of a schematized cylindrical tank having hemispherical ends according to the present invention;

FIG. 3 is a graph showing the relationship of surface area of a cylindrical tank with hemispherical ends as a function of the ratio of tank length and the radius of the hemispherical ends according to the present invention;

FIG. 4 is a graph showing the temperature of the cylindrical tank surface as a function of electrical charging efficiency, for various surface area to volume ratios for the tanks according to the present invention;

FIG. 5 is a graph showing the temperature of the cylindrical tank surface as a function of electrical charging efficiency, for various tank pressures when the ratio of surface area to tank volume is held constant according to the present invention;

FIG. 6 is a graph showing the temperature of the cylindrical tank surface as a function of electrical charging efficiency, for electrical charging times according to the present invention;

FIG. 7 is a graph showing the temperature of the cylindrical tank surface as a function of electrical discharging efficiency, for various surface area to volume ratios for the tanks according to the present invention;

FIG. 8 is a graph showing the temperature of the cylindrical tank surface as a function of electrical discharging efficiency, for various tank pressures when the ratio of surface area to tank volume is held constant according to the present invention;

FIG. 9 is a graph showing the temperature of the cylindrical tank surface as a function of electrical discharging efficiency, for electrical discharging times according to the present invention; and FIG. 10 is a graph showing the temperature of the cylindrical tank surface during charging and discharging as a function of overall efficiency of the URFC according to the present invention.

DEFINITIONS

Reactant gases refers to such reactants as oxygen and hydrogen which can be combined in a fuel cell to produce water and electric power. The term 'reactants' is sometimes used herein to mean the same thing as 'reactant gases' or 'reactants.'

URFC stands for Unitized Regenerative Fuel Cell.

URFC stack refers to the operative part of the present invention, namely the reversible fuel cell stack that uses proton exchange membrane technology or its equivalent in a way that can be used to create electric power from reactants such as hydrogen and oxygen, or it can be used to produce reactants such as hydrogen and oxygen when electric power is used to drive the process so as to dissociate a material such as water. The terms 'fuel cell stack,' 'FC stack,' or 'cell stack,' are used hereinbelow to mean the same thing as 'URFC stack.'

DETAILED DESCRIPTION OF THE PREFERRED EMBODIMENT

The Unitized Regenerative Fuel Cell (URFC) system 10 of FIG. 1 "charges" and "discharges" like a rechargeable battery. While charging, the URFC system 10 operates the electrolysis process, which splits water into hydrogen and oxygen. While discharging, the URFC system 10 operates the fuel cell process, which combines hydrogen and oxygen and produces electricity. Most generally, the URFC system 10 according to the present invention comprises reactant gas storage tanks, a water storage reservoir, a fuel cell stack, fuel cell pressure control devices, reactant gas feed lines communicating between the fuel cell stack and the reactant gas storage tanks, and power input/outputs and controls.

Generally speaking, a URFC system operates either to electrolyze a substance such as water into its chemical constituents or as a fuel cell in which the chemical constituents are chemically combined and electricity is produced.

When the URFC stack is used as an electrolytic cell, so as to store chemical energy in the form of stored reactants produced from an electrical energy input, the reactant gases produced during electrolysis are expelled from the fuel cell stack by the production of still more gases from the cell stack. The continued production of gases by the cell stack pushes the gases into the reactant gas storage tanks, gradually "pumping" the gases to higher and higher pressures within the tanks where they are stored. In addition, to the reactant gases such as oxygen and hydrogen, a certain amount of water vapor also accompanies these reactant gases as they are expelled from the cell stack and pushed toward their respective storage tanks.

When operated as a fuel cell (producing electric power from chemical reactants), reactant gases flow into the fuel cell stack where they chemically react with each other so as to produce electric power. In the specific instance wherein the reactants are oxygen ($O_2$) and hydrogen ($H_2$), the resultant water ($H_2O$) that forms inside of the URFC stack is removed by either the capillary action of wicking material that is in close proximity to the active electrode sites, or the water is driven out of the cell stack by pressure differentials inside the stack. That is to say that the water is pushed out of the cell by a pressure difference between the water pressure inside the cell stack and the water pressure inside an external water storage reservoir.

The management of reactants inside the URFC cell stack is influenced by both the materials and the designs of the components inside the cell stack. In addition to the development of the reversible electrodes, proper and reliable reactant management inside the cell stack is most important in achieving acceptable URFC performance. The present invention is directed toward ways to manage the reactants inside the cell stack during both electrolysis and fuel cell operation, and also during transitions between these different processes.

URFC System

Referring now to FIG. 1, there is shown in schematic format an entire URFC system 10, according to the present invention. The system 10 consists of the URFC stack 12, a reactant gas storage tank system 14,16, bi-directional reactant pressure controls 18, 18' between the URFC stack and the reactant gas storage tanks, a bellows type expandable water storage reservoir 22 disposed within a pressure dome 25, a first heat pipe 24 communicating heat between the URFC stack and one reactant storage tank 16, a second heat pipe 26 communicating heat between the URFC stack and a second reactant storage tank 14, a thermal control system 28, 28', and a power/system control interface 30. The bellows type water storage reservoir is made of metal and is prestressed to open to a maximum volume when no internal or external forces act upon it. There is also shown in FIG. 1 a pipe 32 communicating between the pressure dome 25 and the reactant input pipe 34. Gas dryers 36,38 are in thermal communication with the reactant storage tanks 16,14, respectively. The operation of the gas dryers 36,38 is described herein. Waste heat from the URFC stack 12 is conveyed by the heat pipes 24,26 to the reactant storage tanks 16,14, respectively, by way of the heat pipe evaporators 28,28' respectively, which are in thermal contact with URFC stack. That is, portions of each heat pipe 24,26 thermally communicate with the respective reactant gas storage tanks 16,14.

The environmental settings within which this invention is intended to operate are anticipated to be cold. In other words, the applications for this URFC system 10 according to the present invention are envisioned to be those of outer space, high atmospheric altitudes, or the surfaces of the moon or Mars and like places wherein typical ambient temperature would be about −40° C. However, it is within the terms of the present invention for the to operate in other settings having less harsh environmental characteristics.

In summary, the present invention is a Unitized Regenerative Fuel Cell (URFC) system 10 that uses heat pipes to convey waste heat from the fuel cell stack 12 to the reactant storage tanks, 14,16. The storage tanks 14,16 are sized and shaped to act as heat sinks and radiators of waste heat from the fuel cell stack 12 to the ambient environment. During charge up, i.e., the electrolytic process, gases are conveyed to the reactant storage tanks 14,16 by way of tubes 34,42 that include dryer portions 36,38 that are integral with the respective surfaces of the storage tanks to which the gases are being conveyed. In other words, each reactant gas dryer is disposed within each of the respective reactant gas feed lines communicating between the respective reactant gas storage tanks and the fuel cell stack. Reactant gases moving through the dryers to their respective storage tanks give up energy to the cold tanks, causing water vapor mixed with the gases to condense out and freeze on the internal dryer surfaces. During operation in its fuel cell mode, the heat pipes 24,26 convey waste heat from the fuel cell stack to the respective reactant gas storage tanks, thereby heating them such that the reactant gases, as they pass though the respective dryers on their way to the fuel cell stacks retrieve the water previously removed. The dryers are able to operate reversibly, returning water to the reactant gases as said reactant gases flow toward the fuel cell stack. An expandable water storage reservoir is also used. It is disposed within a pressure dome that communicates with a reactant gas pressure line associated with a reactant gas feed line to one of the reactant gas storage tanks. The pressure dome is thus pressurized by reactant gas pressure communicated to it by said feed line to the said one of the reactant gas storage tanks.

Discussed below are the details of operation of an exemplary URFC system 10 according to the present invention that uses oxygen and hydrogen as the reactant gases and chemical energy storage media. Specifically discussed below in detail are the operation of the present invention during its two respective modes of (1) charging, during which water is electrolyzed into oxygen and hydrogen, and (2) discharge when the fuel cell operates to cause the chemical combination of the reactant gases, hydrogen and oxygen, so as to produce electrical power.

Electrolysis—$O_2$

During the electrolysis process oxygen is produced inside the URFC stack 12. A mixture of oxygen and water vapor that is in equilibrium with the temperature and pressure of the URFC stack exits the URFC stack by means of the tube/pipe 34 which leads to the gas dryer 38 and thence to junction point 40 where the line bifurcates, one portion leading to the oxygen storage tank 14 by way of the bi-directional pressure control 18', and the other portion communicating with the pressure dome 25 that contains the expandable water storage reservoir 22. As is noted below, the expandable water storage reservoir 22 has two counteracting forces acting on it: (1) pressure from the oxygen line 34, which pushes inward on it, tending to shrink the volume of the tank 22 and (2) it is spring-loaded in such a way as to cause its volume to increase.

The oxygen regenerative gas dryer 38 communicates with the oxygen gas pipe 34. The oxygen regenerative dryer is in close thermal contact with the surface of the oxygen tank 14. As the oxygen water vapor mixture flows through the dryer 38, heat from the gas mixture is transferred to the surface of the oxygen tank. The loss of energy from the oxygen mixture causes the water vapor in the mixture to condense and/or freeze on the inside wall of the oxygen regenerative dryer 38. Water that is thus separated from the gaseous oxygen remains inside the dryer tubing 34 while the dried oxygen eventually is conveyed to the tank 14 by way of the bi-directional pressure control 18'. The oxygen pipe 34 bifurcates at junction 40, allowing a portion of the oxygen to move into (and later, during fuel cell operation, out of) the pressure dome 25 that surrounds the water storage reservoir 22. The bi-directional pressure control 18' acts as a back-pressure regulator that controls the oxygen pressure inside the URFC stack 12 and the water tank pressure dome 25 and allows this pressure to gradually increase all the while keeping this pressure within user-defined limits with respect to the hydrogen pressure inside the URFC stack. The dried oxygen that passes through the bi-directional pressure control 18' enters the oxygen storage tank 14 where it accumulates until needed during the discharge (or fuel cell) cycle of operation described below. This process continues until either the electrical input charging energy is stopped, the oxygen tank reaches it's maximum pressure, or the water tank reaches its minimum level.

Electrolysis—$H_2$

During the electrolysis process hydrogen is also produced inside the URFC stack 12. A mixture of hydrogen and water vapor that is in equilibrium with the temperature and pressure of the URFC stack exits the URFC stack by way of the pipe 42 and into a hydrogen regenerative dryer portion 36, which is in close thermal contact with the surface of the hydrogen tank 16. As the hydrogen water vapor mixture flows through the dryer 36, heat from the gas mixture is transferred to the surface of the hydrogen tank. The loss of energy from the hydrogen mixture causes the water vapor in the mixture to condense and/or freeze on the inside wall of the hydrogen regenerative dryer. As with the water in the oxygen pipe, described hereinabove, water that is separated from the gas phase remains inside the dryer tubing 36 while the dried hydrogen eventually makes its way to the bi-directional hydrogen pressure control 18 and then to the storage tank 16. The bi-directional pressure control 18 acts as a backpressure regulator that controls the hydrogen pressure inside the URFC stack 12 and allows this pressure to gradually increase all the while keeping this pressure within user-defined limits with respect to the oxygen pressure inside the URFC stack. Dried hydrogen that passes through the bi-directional pressure control 18 enters the hydrogen storage where it gradually accumulates until needed during the discharge cycle of operation. This process continues until either the charging energy is stopped, the hydrogen tank reaches its maximum pressure, or the water tank reaches its minimum level.

Electrolysis—$H_2O$

During the electrolysis, or charging, process, the URFC 12 electrolyzes water. As the water is consumed, the URFC draws in water from the external water storage reservoir 22 by a siphon-like action through the pipe 44. The water storage reservoir 22 consists of a bellows inside the aforementioned pressure dome 25. The bellows has a spring-like action that, left unrestrained, would cause the bellows to expand to nearly the entire volume of the pressure dome. The water is stored inside the bellows. Outside the bellows 22, but inside the pressure dome 25, pressurized oxygen is present. This arrangement allows the water volume inside the bellows 22 to expand or contract as needed (during either electrolytic or fuel cell operation) all the while keeping the water pressure slightly less than the oxygen pressure that exists outside the bellows 22. It is important to maintain the water pressure slightly below the oxygen pressure, because this pressure difference keeps liquid water separated from the oxygen and hydrogen gas inside the URFC stack 12. The expandable bellows type water storage reservoir is contained within the pressure dome 25. The gas pressure line 32 communicates between the reactant gas feed lines 34 and the dome 25 that contains the expandable water storage reservoir 22.

Electrolysis—Thermal Control System

One of the key features of the URFC system 10 according to the present invention is the heat pipe thermal control system. During electrolysis, the waste heat produced by the URFC stack 12 is transferred to the system of heat pipes 24,26. Bypass valves 46,46' in the respective heat pipes 24,26 allow fluid within the heat pipes to bypass the heat radiating surfaces of oxygen and hydrogen storage tanks 14,16, respectively, when URFC stack 12 is not at optimum operating temperature. When the URFC stack is at its proper operating temperature, the fluid in the respective heat pipes flows through portions of the heat pipes that are wrapped around the oxygen and hydrogen storage tanks, 14,16. The portions of the heat pipes that are wrapped around the respective gas storage tanks are in close thermal contact with the surfaces of the tanks so that, as heat pipe fluid flows through the tubing wrapped around the tanks, heat is transferred from the heat pipe system to the surface of the gas storage tanks. The tank walls act in a way that is equivalent to cooling fins on the heat pipes, spreading the waste heat across the surfaces of both the oxygen and hydrogen storage tanks, which thence radiate the waste heat to the cold ambient environment. Because the amount of waste heat produced during electrolysis is small per unit area over which that heat is spread, the tank surface temperature of both the oxygen and hydrogen storage tanks, 14,16, drops below 0° C.

Electrolysis—Power and Control

The power control system 30 of the URFC system 10 matches the voltage of the electrical power source (not shown) to the required voltage needed by the URFC stack 12 for electrolysis. A computer control manages the pressure controls as well as the health monitoring and communications.

Fuel Cell Operation—$O_2$

When the present URFC system 10 is operated in the fuel cell mode (i.e., generating electric power from the chemical combining of the reactant gases), oxygen is consumed inside the URFC stack 12. As oxygen is consumed, oxygen pressure inside the URFC stack 12 and inside the water tank pressure dome 25 is reduced from the pressure levels that existed during the previous electrolysis operation described hereinabove. Oxygen pressure inside the URFC stack 12 falls until the pressure is at the steady-state fuel cell operating pressure (about 50 psi). Once at this pressure, oxygen flows from the oxygen storage tank 14 as needed to maintain the steady-state fuel cell operating pressure. The oxygen flows from the water tank 22 inside the pressure dome 25 and from the oxygen storage tank 14 through the oxygen regenerative dryer 38 on its way to the URFC stack 12. As the oxygen flows through the regenerative dryer 38, it absorbs heat and water vapor from the inside surface of said dryer. The dryer tube 38 is in turn warmed by the surface of the tank 14 which is dissipating the substantially higher amount of waste heat generated during the fuel cell operation. Due to the lower pressure and relatively high temperature, the oxygen gas, as it flows from the tank 14 to the URFC stack 12, eventually evaporates all of the water previously trapped on the wall of the dryer tube 38 during the electrolysis process. In doing so, the dryer tube is "regenerated" and thereby made ready for the next electrolysis phase of operation. During the fuel cell operation the bi-directional oxygen pressure control 18' acts as a forward, or pressure reducing, regulator that controls the oxygen pressure inside the URFC stack 12 and water tank pressure dome 25 and allows these pressures to gradually decrease to the steady-state fuel cell operating pressure. The bi-directional pressure regulator 18' does this while keeping the oxygen pressure in the URFC stack within prescribed limits with respect to the hydrogen pressure inside the URFC stack. The fuel cell mode of operation continues as long as electrical energy is withdrawn from the URFC system or until the oxygen storage tank falls below its minimum pressure or the water storage reservoir 22 reaches its maximum filled state.

Fuel Cell Operation—$H_2$

During the fuel cell mode of operation, hydrogen is consumed inside the URFC stack 12. As hydrogen is consumed the hydrogen pressure inside the URFC stack is reduced from the pressure achieved during the previous electrolysis operation. Hydrogen pressure within the URFC stack decreases until the pressure is at the steady state fuel cell operating pressure (about 50 psi). Once at this pressure, hydrogen flows from the hydrogen storage tank 16 to maintain the steady-state operating pressure of the fuel cell stack 12. Hydrogen flows from the hydrogen storage tank 16 through the hydrogen regenerative dryer 36 on its way to the URFC stack. As the hydrogen flows through the regenerative dryer 36, it absorbs heat and water vapor from the inside surface of said dryer tube. The dryer tube is in turn warmed by the surface of the tank 16, which is dissipating the substantially higher amount of waste heat generated during the fuel cell operation. Due to the lower pressure and warm temperature inside the dryer 36, the hydrogen gas, as it flows back to the URFC stack 12, eventually evaporates all of the water previously trapped on the wall of the dryer tube during the electrolysis process. In doing so, the dryer tube is "regenerated" and ready for the next electrolysis phase. During the fuel cell operation, bi-directional pressure control 18 acts as a forward (pressure reducing), regulator that controls the hydrogen pressure inside the URFC stack 12 and allows this pressure to gradually decrease to the steady state fuel cell operating pressure. The bi-directional pressure regulator 18 does this while keeping the URFC stack hydrogen pressure within prescribed limits with respect to the oxygen pressure inside the URFC stack. The fuel cell operation continues as long as electrical energy is withdrawn from the URFC system or until the hydrogen storage tank falls below its minimum pressure or the water storage reservoir reaches its maximum filled state.

The water formed inside of the URFC during fuel cell operation (i.e., electricity production) is removed by the capillary action of wicking material that is in close proximity to the active electrode sites inside the cell stack. The water is pushed out of the cell by a pressure difference between the water pressure inside the cell stack and the water pressure inside an external water storage reservoir.

Fuel Cell Operation—$H_2O$

During fuel cell operation the URFC stack 12 (FIG. 1) produces water. As the water is produced, the water cavities inside the URFC system 10 draw in the water from the electrode surfaces. The water is eventually drawn into the water storage reservoir 22 by a siphon-like action. The spring-like action of the water storage reservoir bellows ensures that the pressure of the water storage cavities within the URFC stack are always lower in pressure than the oxygen cavities within the URFC stack regardless of how full the water storage reservoir 22 is. This pressure difference within the URFC stack maintains the gas/liquid separation within the URFC stack, and prevents cell flooding during fuel cell operation.

Fuel Cell Operation—Thermal Control System

During the fuel cell mode operation of the reversible fuel cell system 10, the waste heat produced by the URFC cell stack 12 is transferred to the system heat pipes 24,26. Bypass valves 46,46' in the heat pipe system allow the heat pipe fluid to bypass the heat radiating surfaces of oxygen and hydrogen storage tanks (14,16 respectively) when the URFC stack 12 is not at its optimum operating temperature. When the URFC stack is at its desired operating temperature, the heat pipe fluid flows through heat pipes 26,24 that are wrapped around the oxygen and hydrogen storage tanks 14,16. The heat pipes are in close thermal contact with the gas storage tank surface so that as the heat pipe fluid flows through the tubing wrapped around the tanks, heat is transferred from the heat pipe system to the surface of the gas storage tanks. The tank walls, acting as a heat fins, spread this waste heat across the entire tank surface of both the oxygen and hydrogen storage tanks. The tank surfaces radiate this waste heat to the cold ambient environment. Because the amount of waste heat produced during fuel cell operation is large per unit area over which that heat is spread, the tank surface temperature of both the oxygen and hydrogen storage tanks goes to well above freezing temperatures.

Fuel Cell Operation—Power and Control

The power control system 30 of the URFC system 10 matches the required voltage of the electrical loads being supplied by the URFC system. A computer system control provides the software control of the pressure controls as well as the health monitoring and communications.

Storage Tank/Radiator Analysis

As described hereinabove, the amount of heat per unit of radiator area is smaller during the electrolysis charge phase of the URFC system operation than during the fuel cell discharge phase of operation. The effect of this is to produce freezing storage tank surface temperatures during the charge phase and above freezing temperatures during the discharge phase. (FIG. 1 shows hypothetical near steady state temperatures of the tanks 14,16 during electrolysis ['charging'] and fuel cell operation ['discharging']. Those hypothetical or exemplary temperatures are, during charging 225° K. and 310° K. during discharging. This is so for both tanks.)

The following analysis characterizes the waste heat management process in terms of the parameters that influence it.

The Stefan-Boltzmann Law states that, $$Q/A = e\sigma(T^4 - T_E^4) \quad (1)$$

where

Q=Heat radiation rate, watts
A=Heat radiation area, m$^2$
e=Emissivity, %
$\sigma = 5.6703 \times 10^{-8}$ watt-m$^{-2}$-K$^{-4}$
T=Temperature of radiating body, K
$T_E$=Temperature of surrounding environment, K Using equation (1) to describe the heat radiation during URFC system charging, $$Q_C/A_T = e\sigma(T_C^4 - T_E^4) \quad (2)$$

where $Q_C$=Heat radiation rate during charging, watt
$A_T$=Total tank surface area, m$^2$
$T_C$=Tank surface temperature during charging, K Similarly, the heat radiation during URFC system discharging can be expressed as, $$Q_D/A_T = e\sigma(T_D^4 - T_E^4) \quad (3)$$

where $Q_D$=Heat radiation rate during disharging, watt
$T_D$=Tank surface temperature during discharging, K The heat radiation rate during charging and during discharging can be expressed as, $$Q_C = (1-\eta_C)\xi_C \quad (4)$$

$$Q_D = (1-\eta_D)\xi_D \quad (5)$$

where $\eta_C$=Energy efficiency during charging, watt/watt
$\eta_D$=Energy efficiency during discharging, watt/watt
$\xi_C$=Theoretical power required during charging, watt
$\xi_D$=Theoretical discharge power produced, watt Based on the higher heating value of hydrogen of 4405 watt-hr per kg of water produced, the average theoretical power during charging and discharging is:

$$\xi_C = 4405 M_W t_C^{-1} \quad (6)$$

$$\xi_D = 4405 M_W t_D^{-1} \quad (7)$$

where $M_W$=Mass of water used or produced, kg
$t_C$=Charging time, hours
$t_D$=Discharging time, hours The heat dissipation area is the combined surface area of the oxygen and hydrogen storage tanks.

$$A_T = A_O + A_H \quad (8)$$

where $A_O$=Oxygen tank surface area, m$^2$
$A_H$=Hydrogen tank surface area, m$^2$ Substituting Equations (4), (6), and (8) into Equation (2) to get an expression for the storage tank surface temperature during the charging phase, $$[(1-\eta_C)4405 M_W t_C^{-1}/(A_O+A_H)] = e\sigma(T_C^4 - T_E^4) \quad (9)$$

Likewise substituting Equation (5), (7), and (8) into Equation (3) to get an expression for the storage tank surface temperature during the discharging phase, $$[(1-\eta_D)4405 M_W t_D^{-1}/(A_O+A_H)] = e\sigma(T_D^4 - T_E^4) \quad (10)$$

The surface area of each gas storage tank can be expressed as the ratio of surface area to volume multiplied by the volume, $$A_O = (A_O V_O^{-1}) V_O \quad (11)$$

$$A_H = (A_H V_H^{-1}) V_H \quad (12)$$

Where $V_O$=Oxygen tank volume, m$^3$
$V_H$=Hydrogen tank volume, m$^3$

Referring to FIG. 2, there is shown in schematic side view a cylindrical tank 60 which corresponds to the shapes of the reactant storage tanks 14,16 in FIG. 1. This idealized cylindrical tank 60 has hemispherical ends 62, each having a radius r. The overall length of the tank 60 is shown as L. Thus each reactant gas storage tanks is cylindrical and has hemispherical ends. The ratio of the storage tank surface area to volume, A/V, can be expressed as, $$A/V = 2/[r-(2/3)(r^2/L)] \quad (13)$$

where

A=Tank surface area, m$^2$
V=Tank volume, m$^3$
r=Tank radius, m
L=Tank length, m FIG. 3 shows a graphical plotting of Equation (13) showing the relationship of the ratio of the tank surface area to its volume, A/V, as a function of the ratio of the radius, r, and the length, L. As the tank gets more and more spherical (i.e., as r/L ¥→1/2) the ratio A/V approaches a value of 3/r. As the tank gets less and less spherical (i.e., as r/L→O) the ratio A/V ratio approaches a value of 2/r.

Substituting Equation (11) and (12), into equations (9) and (10), and assuming that the oxygen and hydrogen tanks have identical A/V ratios, the heat radiation expression during the charge and discharge phase can be expressed as, $$(1-\eta_C)4405 M_W t_C^{-1}/[(A/V)(V_O+V_H)] = e\sigma(T_C^4 - T_E^4) \quad (14)$$

Likewise substituting Equation (5), (7), and (8) into Equation (3) to get an expression for the storage tank surface temperature during the discharging phase, $$(1-\eta_D)4405 M_W t_D^{-1}/[(A/V)(V_O+V_H)] = e\sigma(T_D^4 - T_E^4) \quad (15)$$

The volume of the oxygen and hydrogen storage tanks can be expressed as, $$V_O = n_O R T_O / P_O \quad (16)$$

$$V_H = n_H R T_H / P_H \quad (17)$$

where $n_O$=Moles of oxygen, gmoles
$n_H$=Moles of hydrogen, gmoles
$T_O$=Temperature of oxygen, K
$T_H$=Temperature of hydrogen, K
$P_O$=Pressure of oxygen, atm
$P_H$=Pressure of hydrogen, atm
$R = 8.2 \times 10^{-5}$, atm-m$^3$-gmole-K$^{-1}$ The volumes of the gas storage tanks don't change during operation of the URFC according to the present invention, and are sized to accommodate the mass of each gas volume stored at the peak level of charge. Under these conditions, it is assumed that the peak charge pressure is approximately the same for both oxygen and hydrogen. It is also assumed that, at peak charge, the oxygen gas temperature is approximately the same as the hydrogen gas temperature for this sizing calculation, and that these temperatures are also equal to the surface temperature of the gas storage tanks during charging of the URFC. Using these assumptions, Equations (14) and (15) can be rewritten as, $$(1-\eta_C)4405 M_w t_C^{-1} / [(A/V) R T_C P_C^{-1}(n_O + n_H)] = e\sigma(T_C^4 - T_E^4) \quad (18)$$

$$(1-\eta_D)4405 M_w t_D^{-1} / [(A/V) R T_C P_C^{-1}(n_O + n_H)] = e\sigma(T_D^4 - T_E^4) \quad (19)$$

where $P_C$=Peak charge pressure, atm

It should be noted that the denominators on the left-hand side of equations (18) and (19) are constants and equal to each other (the combined surface area of the tanks does not change from charge to discharge once the tanks have been sized).

The moles of oxygen and hydrogen can be expressed as, $$n_O + n_H = 1.5 n_W \quad (20)$$

where $n_W$=mass of water used or produced, gmoles

The moles of water can be expressed as, $$n_W = M_W / 0.018 \quad (21)$$

Substituting Equations (20) and (21) into Equations (18) and (19) yields, $$(1-\eta_C)4405 M_w t_C^{-1} / [(A/V) R T_C P_C^{-1}(1.5 M_W / 0.018)] = e\sigma(T_C^4 - T_E^4) \quad (22)$$

$$(1-\eta_D)4405 M_w t_D^{-1} / [(A/V) R T_C P_C^{-1}(1.5 M_W / 0.018)] = e\sigma(T_D^4 - T_E^4) \quad (23)$$

Simplifying Equations (22) and (23)

$$(1-\eta_C)(4405 t_C^{-1})(0.012) / [(A/V) R T_C P_C^{-1}] = e\sigma(T_C^4 - T_E^4) \quad (24)$$

$$(1-\eta_D)(4405 M_w t_D^{-1})(0.012) / [(A/V) R T_C P_C^{-1}] = e\sigma(T_D^4 - T_E^4) \quad (25)$$

Referring now to FIG. 4, the surface temperature, $T_C$, of a cylindrical reactant storage tank is graphed as a function of charging efficiency for three different various A/V ratios, is shown according to Equation (24). Peak charging pressures in the tanks, and the charging times, are held constant. FIG. 5, like FIG. 4, is a graphical representation of $T_C$ from Equation (24), for three peak charging pressures, with A/V and charging time being held constant. FIG. 6 is also a graphical representation of $T_C$ from Equation (24) as a function of charge efficiency for three different charging times, with A/V and peak charging pressure being held constant.

In each of the FIGS. 4,5 and 6, the expected range of charging energy efficiency is highlighted on the right sides. The freezing point of water is also indicated. The three FIGURES show that within the expected charge energy efficiency range and the range of tank's A/V ratio, discharge time, and peak charge pressure, the surface temperature of the storage tanks during charging generally stay below freezing.

Equation (25) is also shown graphically in FIGS. 7,8 and 9, with the tank surface temperature, $T_D$, during discharge, being shown as a function of discharge energy efficiency. In FIG. 7, peak discharging pressure and the discharging time are held constant for three different A/V ratios. FIG. 8 also shows $T_D$ as a function of discharging efficiency, with discharge time, $t_D$, and peak charge pressure, $P_C$, being held constant for three different tank ratios, A/V. In FIG. 9, the A/V ratio and the peak charge pressure are constant, for three different discharge times, $t_D$, according to Equation (25). In each of the FIGS. 7,8 and 9, the expected range of discharge phase energy efficiency is highlighted, and the freezing point of water is indicated. The FIGS. 7,8, and 9 show that within the expected discharge energy efficiency range and the range of tank A/V ratio, discharge time, and peak charge pressure, the surface temperature of the gas storage tanks during discharging stays above freezing.

FIG. 10 is a graphical representation of the preceding graphical representations, showing tank surface temperature for both a charge and discharge as a function of charge and discharge efficiency. FIG. 10 shows that for a system with a $^{12}/_{12}$ hour charge/discharge where the peak charge pressure is 27 atmosphere (400 psia), during charging the surface temperature of the tanks is well below the freezing temperature, whereas during the discharge phase the tank surface temperature is well above freezing.

PRIOR ART CONSIDERATIONS

Except for the partially pressurized water storage reservoir of the present URFC invention, the other features of the URFC that are deemed patentable all relate to the management of waste heat from the two modes of operation of the FC as a fuel cell or as an electrolysis cell. More specifically, the present invention incorporates a spring loaded water storage reservoir that is externally pressurized by gas from one of the reactant tanks, and waste heat from the fuel cell stack is conveyed by heat pipes to the reactant storage tanks, from which the waste heat is radiated to the local environment.

In reference to the specific prior art teachings cited in the Background section above, U.S. Pat. No. 3,975,913 to Erickson describes a closed-cycle gas generator in which waste heat is used to drive closed cycle heat engine, rather than being conducted to gas storage tanks. No provision is made for storing water in, or retrieving it from an expendable, spring load storage tanks.

U.S. Pat. No. 4,490,445 ('445) to Hsu discloses a reversible 'solid oxide electrochemical energy converter' having a counter-flow heat exchanger that disposes of waste heat by directing it to heating the incoming fuel gases. However, the counter-flow heat exchanger of '445 is distinct from the present invention wherein heat that is delivered to the "dryer" (36,38 in FIG. 1) portion of the present invention receives its heat from the surface of the reactant storage tanks.

U.S. Pat. No. 5,338,622 to Hsu, et al discloses a fuel cell system that addresses specifically the issue of waste heat management, but, as in '445 to Hsu above, the heat transfer means is that of a counter-flow heat exchanger assembly.

U.S. Pat. No. 5,401,589 to Palmer, et al discloses a fuel cell with a reformer, wherein the reformer receives waste heat from the fuel cell. The use of a heat pipe is mentioned, but then dismissed because "heat pipes are not preferred due to the risk of leakage."

U.S. Pat. No. 5,506,066 to Sprouse discloses an 'ultra passive,' variable pressure RFC having a single $H_2$ storage tank "that encloses a plurality of smaller gaseous $O_2$ storage tubes." No "pumping elements" are used. A heating/cooling coil inside the $H_2$ tank prevents icing or overheating, said heating/cooling coil (400 in FIG. 5) has an unspecified source or sink for heat.

U.S. Pat. No. 5,510,202 to McCoy discloses a variable pressure fuel cell. McCoy uses prior art images similar to those of Sprouse in '066, suggesting that this patent's waste heat management system might be similar to that of Sprouse '066. However, the single reference to a "heating/cooling coil," in relation to a metal hydride storage tanks, does not specify a heat source or sink.

U.S. Pat. No. 5,678,410 to Fujita et al discloses a fuel cell system for use with cars. From Abstract: "The combined system preferably includes a heat storage tank disposed in a conduit of a heating medium . . . " A heat transfer medium "such as water" is used to convey heat to various heat exchangers including one that moves heat to or from a metal-hydride storage tank. Whereas waste heat from the fuel cell portion of this invention is discarded into metal hydride storage tanks during the discharge phase of operation of the system, the coolant is driven by two pumps 81 and 82 (FIG. 1) and the coolant flow is managed by a plurality of solenoid valves. This is not the passive system of the sort described in the present disclosure, and no heat pipe system is mentioned.

U.S. Pat. No. 5,885,727 to Kawatsu discloses a fuel cell arrangement in which waste heat is conveyed, by way of apparently integral cooling water tubes, to reaction tanks 30 and 50 wherein, respectively, oxygen and hydrogen are generated for use in the fuel cell. While waste heat is conveyed, by water in tubes, to reaction tanks, the coolant is water and it is actively pumped. In one embodiment, a heat pump links separate, isolated cooling loops for the fuel cell stack and at least one reactant source (FIG. 9), while a second embodiment (FIG. 11) includes an external radiation.

US 2003/001721 A1 to Wattelet et al discloses a mobile and compact fuel cell system having "an integrated heat exchanger unit" that combines the fuel cell cooling system and a cathode exhaust gas condenser, both being cooled, in parallel, by a shared cooling air stream. A cooling tube 38 appears integrated with the fuel cell. No heat pipes are used, though, and any storage tanks involved are not used as heat sinks.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A unitized regenerative fuel cell (URFC) system that operates either in a fuel cell mode while discharging or in an electrolytic cell mode when charging comprising first and second reactant gas storage tanks, a water storage reservoir, and a fuel cell stack, comprising:

first and second reactant gas feed lines communicating between the fuel cell stack and the first and second reactant gas storage tanks for conveying reactant gases from the fuel cell stack to the first and second reactant gas storage tanks and for returning reactant gases from the first and second reactant gas storage tanks to the fuel cell stack:

the first and second reactant gas storage tanks acting as heat sinks and radiators of waste heat to an ambient environment below 0° C. so that during the electrolytic cell mode the surface temperature of the first and second reactant gas storage tanks is below 0° C. and during the fuel cell mode the tank surface temperature of the first and second reactant gas storage tanks is above freezing temperature;

first and second heat pipes thermally communicating with said fuel cell stack and first and second reactant gas storage tanks, respectively for conveying waste heat from the fuel cell stack to the surface of the first and second reactant gas storage tanks;

first and second reactant gas dryers in thermal communication with the first and second reactant gas storage tanks, respectively, and disposed within the first and second reactant gas feed lines, respectively, each of the first and second reactant gas dryers is integral with a surface of the first and second reactant gas storage tanks, respectively; whereby reactant gases conveyed from the fuel cell stack to the first and second reactant gas storage tanks during the electrolytic cell mode give up energy to storage tanks so that water vapor mixed with the reactant gases condenses out and freezes on internal gas dryer surfaces and during the fuel cell mode reactant gases passing from the first and second reactant gas storage tanks through the first and second reactant gas dryers on their way to the fuel cell stack are heated by the first and second reactant gas storage tanks from heat generated by the fuel cell stack whereby water on the internal gas dryer surfaces melts and returns to the reactant gases flowing to the fuel cell stack;

an expandable water storage reservoir formed as a bellows contained within a pressure dome, said water storage reservoir having water stored inside the bellows and being connected to the fuel cell stack for allowing the water volume inside the bellows to expand or contract depending upon the operation of the fuel cell stack; and a gas pressure line communicating between the first reactant gas feed lines and the pressure dome that contains the expandable water storage reservoir for directing pressurized gas from the first reactant gas storage tank into the pressure dome and outside of the bellows so that the water pressure in the bellows is less than the gas pressure outside of the bellows.

2. The URFC system of claim 1 in which the first and second reactant gas storage tanks are cylindrical and have hemispherical ends.

3. The URFC system of claim 1 in which the first and second reactant gas dryers operate reversibly, and enable gas flow of first and second reactant gases between the first and second reactant gas storage tanks, respectively, and the fuel cell stack and between the fuel cell stack and the first and second reactant gas storage tanks.

4. The URFC system of claim 1 in which the expandable water storage reservoir is spring-loaded in such a way as to cause its volume to increase.

5. A unitized regenerative fuel cell (URFC) system that operates either in a fuel cell mode while discharging and in an electrolytic cell mode when charging comprising:

first and second reactant gas storage tanks acting as heat sinks and radiators of waste heat from the fuel cell stack to an ambient environment of below 0° C., a fuel cell stack, first and second reactant gas feed lines communicating between the fuel cell stack and the first and second reactant gas storage tanks for conveying reactant gases from the fuel cell stack to the first and second reactant gas storage tanks and for returning reactant gases from the first and second reactant gas storage tanks to the fuel cell stack, first and second heat pipes thermally communicating with said fuel cell stack and in thermal contact with the first and second reactant gas storage tanks, respectively for conveying waste heat from the fuel cell stack to the surface of the first and second reactant gas storage tanks so that during the electrolytic cell mode the surface temperature of the first and second reactant gas storage tanks is below 0° C. and during the fuel cell mode the tank surface temperature of the first and second reactant gas storage tanks is above freezing temperature; and first and second reactant gas dryers means disposed within the first and second reactant gas feed lines, respectively, and in thermal communication with and integral with a surface of the first and second reactant gas storage tanks, respectively, for causing reactant gases conveyed from the fuel cell stack to the first and second reactant gas storage tanks during the electrolytic cell mode to give up energy to storage tanks whereby water vapor mixed with the reactant gases condenses out and freeze as water on internal gas dryer surfaces and for causing reactant gases passing through the first and second reactant gas dryers on their way to the fuel cell stack during the fuel cell mode from the first and second reactant gas storage tanks to be heated by the heat generated by the fuel cell stack whereby water on the internal gas dryer surfaces melts and returns to the reactant gases flowing.

6. The URFC system of claim 5 including:

an expandable water storage reservoir formed as a bellows contained within a pressure dome, said water storage reservoir having water stored inside the bellows and being connected to the fuel cell stack for allowing the water volume inside the bellows to expand or contract depending upon the operation of the fuel cell stack; and a gas pressure line communicating between the first reactant gas feed lines and the pressure dome that contains the expandable water storage reservoir for directing pressurized gas from the first reactant gas storage tank into the pressure dome and outside of the bellows so that the water pressure in the bellows is less than the gas pressure outside of the bellows.

7. The URFC system of claim 6 in which the expandable water storage reservoir is spring-loaded in such a way as to cause its volume to increase.

* * * * *